Jan. 28, 1969 A. J. SHELDON 3,424,261
VEHICLE TRANSMISSIONS
Filed April 29, 1966 Sheet 1 of 3

Inventor
ANTHONY JOHN SHELDON
By
Mason, Fenwick & Lawrence
Attorneys

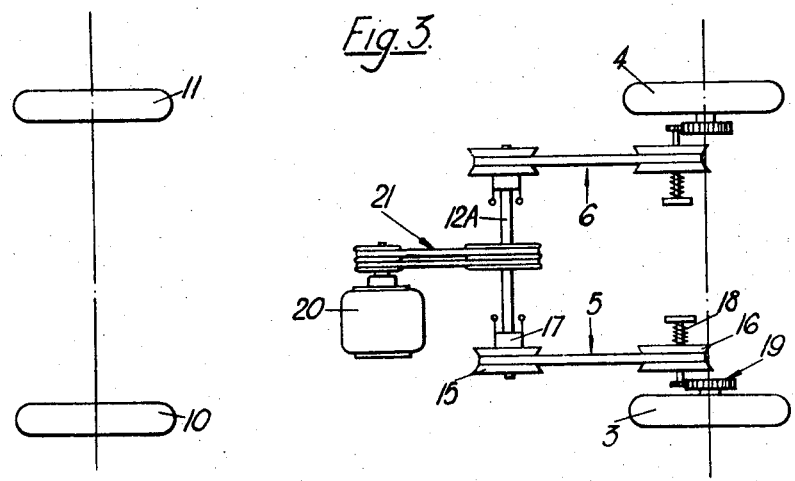
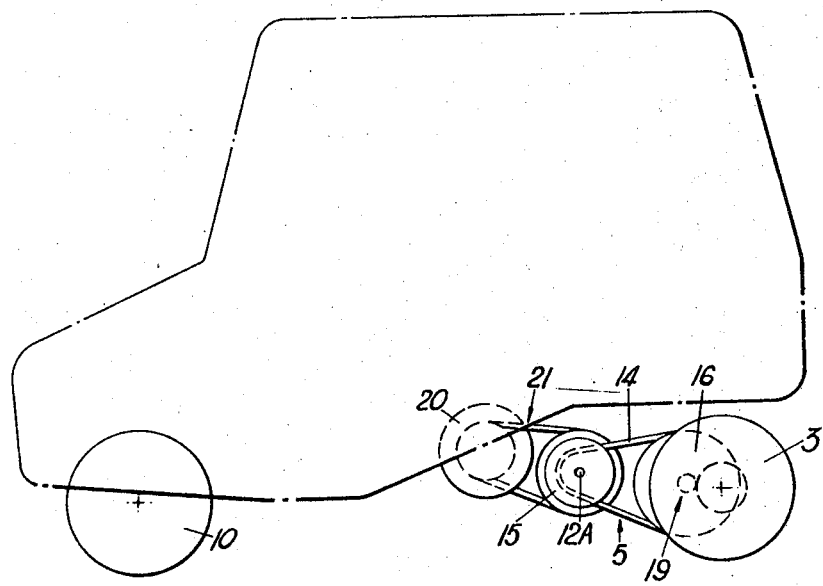
Inventor
ANTHONY JOHN SHELDON

United States Patent Office 3,424,261
Patented Jan. 28, 1969

3,424,261
VEHICLE TRANSMISSIONS
Anthony John Sheldon, Evenlode Place, Moreton-on-the-Marsh, Gloucestershire, England
Filed Apr. 29, 1966, Ser. No. 546,442
Claims priority, application Great Britain, Apr. 30, 1965, 18,206/65
U.S. Cl. 180—70                          3 Claims
Int. Cl. B60k *17/02, 5/00, 1/02*

ABSTRACT OF THE DISCLOSURE

In a motor vehicle having two driven wheels and two infinitely variable V-belt drives one for each driven wheel, the input pulley of each V-belt drive is centrifugally controlled in relation to motor speed by a device which serves also to engage a clutch between the motor and the said input pulley.

---

This invention relates to motor vehicles.

According to the present invention there is provided a motor vehicle having motor means for driving the vehicle, a pair of driven ground wheels, and variable-ratio V-belt drives one for each driven ground wheel; each V-belt drive having a first variable diameter pulley for driving connection with the motor means, a second variable diameter pulley in driving connection with one of the driven ground wheels, said second variable diameter pulley being yieldably spring urged to tend to adopt its maximum effective diameter, an endless flexible V-belt trained round the first and second variable diameter pulleys for transmitting drive therebetween, a clutch for placing the first variable diameter pulley in driving connection with the motor means, and a centrifugally operated device drivingly connected to the motor means and operative during increasing motor speed initially to engage the said clutch at a predetermined motor speed and then progressively to urge the first variable diameter pulley means to tend to adopt a maximum effective diameter and operative during decreassing engine speed in the reverse of the manner of operation during increasing engine speed.

Embodiments of the invention will now be described, by way of example, with reference to the accompanying drawings, in which:

FIG. 3 is a diagrammatic layout of a motor vehicle according to the present invention, and shows a single electric motor in driving connection with a pair of driven ground wheels;

FIG. 4 is a diagrammatic side elevation of a motor vehicle having a drive according to FIG. 3;

Figure 1:
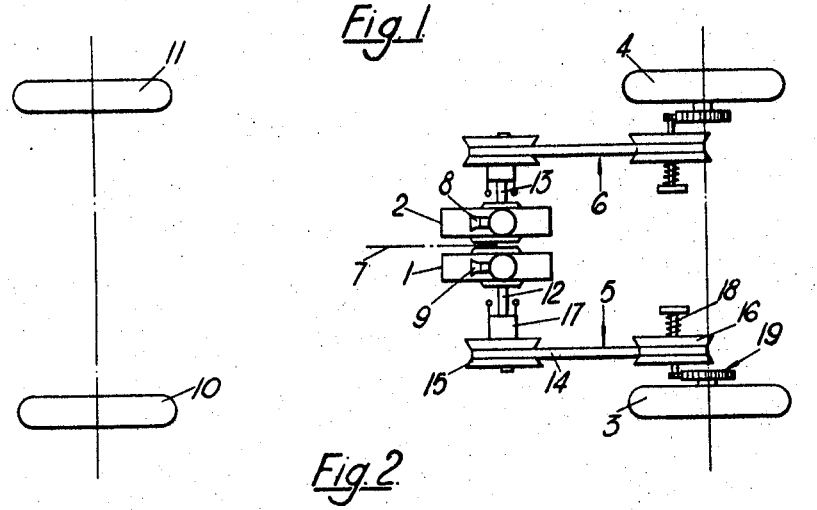
FIG. 1 is a diagrammatic layout of a motor vehicle according to the present invention, and shows a separate internal combustion engine for each driven ground wheel.
Figure 2:
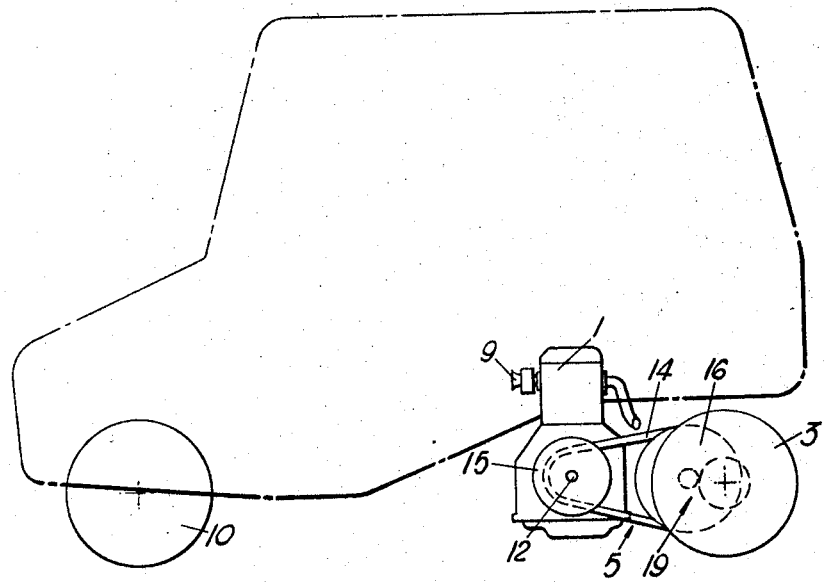
FIG. 2 is a diagrammatic side elevation of a motor vehicle having a drive according to FIG. 1.
Figure 5:
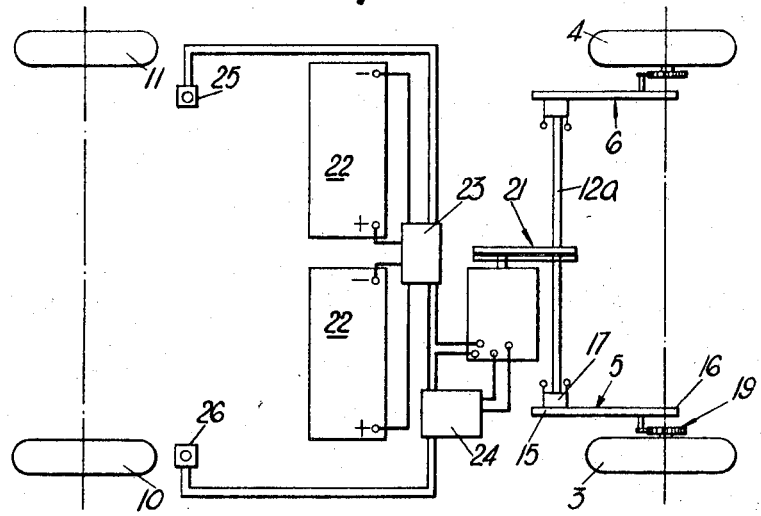
FIG. 5 is a diagrammatic layout of a motor vehicle according to FIG. 3 and additionally shows an electrical circuit, in diagrammatic form, associated with the single electric motor and, FIG. 6 is a more detailed electrical circuit diagram of components shown in FIG. 5.

With reference to FIGS. 1 and 2 of the accompanying drawings, a motor vehicle according to the present invention has motor means in the form of a pair of internal combustion engines 1 and 2 each of which drives a ground wheel 3 and 4 respectively by way of a variable-ratio V-belt drive 5 and 6 respectively. The engines 1 and 2 are arranged so as to rotate at substantially equal speeds by means of ganged controls 7 connected to their carburetors 8 and 9. The motor vehicle is steered by means (not shown) connected to a pair of front wheels 10 and 11.

The engines 1 and 2 are arranged so that their output shafts or crankshafts 12 and 13 are normal to the fore and aft direction of the vehicle.

The drives to each of the ground wheels 3 and 4 are identical and therefore one only of the drives will now be described.

The variable-ratio V-belt drive 5 consists of an endless flexible V-belt 14 trained round first and second variable diameter pulleys 15 and 16 respectively. Each of the pulleys 15 and 16 consist of a pair of spaced flanges, the opposed faces of which define a generally V-shaped seat for engagement by the belt 14. In each of the pulleys 15 and 16, one of the flanges is movable axially towards and away from the other flange, thereby increasing or decreasing the effective diameter of the pulley. The pulley 15 is drivingly connected to the crankshaft 12 of the engine 1 by way of a centrifugal device 17 which connects the crankshaft 12 to the pulley 15 when the engine speed reaches a predetermined value, and thereafter progressively advances the inner flange of the pulley towards the corersponding outer flange, thus increasing the effective diameter of the pulley 15 as the engine speed increase. The inner flange of the pulley 16 is yieldably spring urged towards the corresponding outer flange by means of a spring 18. Thus the pulley 16 accommodates expansion of the pulley 15, the effective length of the belt 14 remaining constant. The pulley 16 is drivingly connected to the ground wheel 3 by way of a gear train 19.

From the foregoing, it will be clear that when the vehicle is at rest, the belt 14 is at the smallest effective diameter on the pulley 15 and at the largest effective diameter on the pulley 16. This arrangement is such that there is a reduction ratio through the drive to provide the necessary wheel torque for starting. The spring loaded pulley 16 maintains the tension in the belt 14 at a required amount.

To move the vehicle from rest, the engine speed is increased whereby the centrifugal device 17 automatically connects the engine to the pulley 15. A further increase in engine speed causes the pulley 15 to increase its effective diameter thus changing the ratio of the drive to the wheel 19. Thus, the belt drive 5 provides an automatic transmission which is infinitely variable between two limits.

Differential action between the driven wheels 3 and 4 is automatically accommodated by the belt drives 5 and 6 as a result of interaction between each driven wheel and its associated engine, the interaction being sufficient to adjust the belt drives 5 and 6 to the correct ratio without causing scrub or rotational distortion in the tyres of the wheels 3 and 4.

Another embodiment of a motor vehicle according to the present invention is shown in FIGS. 3, 4, 5 and 6 in which identical parts are indicated by the same reference numerals.

In this embodiment, the power source means is in the form of a single electric motor 20 supplied by electrical storage batteries 22. The power available in the batteries 22 is connected to the motor 20 by way of a series-parallel-off solenoid operated switch 23, and a solenoid operated reversing switch 24. The solenoid (not shown) of the series-parallel-off switch 23 is controlled by a remote acelerator switch 25, and the solenoid (not shown) of the reversing switch 24 is controlled by a remote forward-reverse switch 26. Thus the speed of the motor vehicle in this embodiment is controlled by the accelerator switch 25 which is used to cause the batteries to be connected either in series or in parallel, and the reversing switch 26 is used to select forward or reverse motion of the vehicle by causing the polarity of the electrical connection between the batteries 22 and the motor 20 to be reversed.

Figure 6:
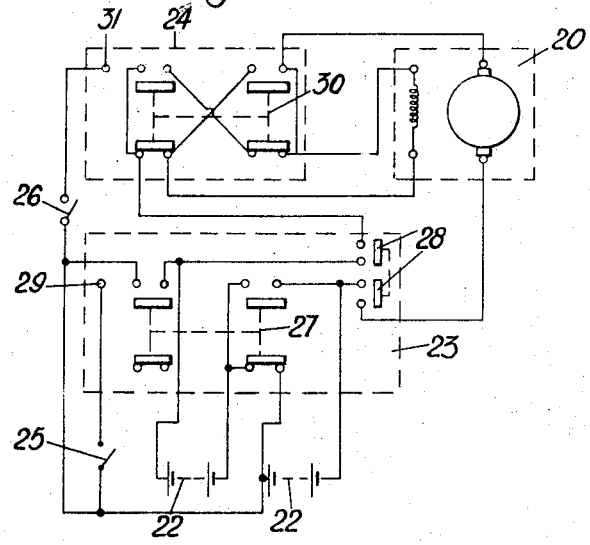

As can be seen from FIG. 6, the motor 20 is a series wound D.C. motor and the batteries 22 are connected in series therewith when the moving contacts 27 of the series-parallel-off switch 23 are in the position shown, and the contacts 28 of this switch are closed. It should be noted that the contacts 28 remain closed while the vehicle is being operated. A solenoid (not shown) may be connected to a supply from the batteries 22 by way of terminal 29 and switch 25, whereupon the moving contacts 27 are actuated so as to connect the batteries 22 in parallel with the motor 20. The operation of the reversing switch 24 is clearly understood by referring to FIG. 6, the moving contacts 30 being actuable by a solenoid (not shown) which may be connected to a supply from the batteries 22 by way of a terminal 31, and the reversing switch 26.

The motor 20 is drivingly connected to a cross-shaft 12A by way of a belt drive 21. The cross-shaft 12 drives the variable-ratio belt drives 5 and 6 in the manner already described.

In a modification of the invention, a single internal combustion engine is provided in place of the engines 1 and 2, the crankshaft of said single engine extending from each side thereof and carrying the pulley 15 and its corresponding pulley of the belt drive 6. Alternatively, a single internal combustion engine is provided in place of a single electric motor 20.

In a further modification of the invention, a separate electric motor is provided in place of each of the engines 1 and 2. Alternatively, a single electric motor is provided in place of the engines 1 and 2, the output shaft of said single electric motor extending from each side thereof and carrying the pulley 15 and its corresponding pulley of the belt drive 6.

Still further modifications may be made without departing from the spirit of the invention, for example the gear train 19 may be dispensed with, and the invention may be applied to a four-wheel-drive vehicle, in which case there may be four variable-ratio belt drives.

As a result of the above described, there is provided a motor vehicle which is relatively cheap in so far as the usual differential gear has been eliminated. Also, the vehicle transmission is extremely simple and accordingly repairs and renewal of parts may be accomplished very quickly. Moreover, the vehicle may have independent suspension on all four wheels, the rear suspensions being of the trailing arm type.

I claim:
1. A motor vehicle having motor means for driving the vehicle, a pair of driven ground wheels, and variable-ratio V-belt drives, one for each driven ground wheel, each V-belt drive comprising a drive shaft operatively connected to said motor means, a first variable diameter pulley mounted directly on said drive shaft, a second variable diameter pulley in driving connection with one of the driven ground wheels, spring means urging the second variable diameter pulley to assume its maximum effective diameter, an endless flexible V-belt trained around the first and second variable diameter pulleys for transmitting drive therebetween, and a centrifugally operated device mounted on said drive shaft adjacent the first variable diameter pulley and drivingly connected to said drive shaft, said device including means operative during increasing motor speed initially to place the drive shaft in driving connection with the first variable diameter pulley at a predetermined motor speed to assume its maximum effective diameter and operative during decreasing motor speed in the reverse of the manner of operation during increasing motor speed.

2. A motor vehicle according to claim 1, wherein the motor means comprises internal combustion engines, one for each of said V-belt drives.

3. A motor vehicle according to claim 1, wherein the motor means comprises electric motors, one for each of said V-belt drives.

References Cited

UNITED STATES PATENTS

| | | | |
|---|---|---|---|
| 585,371 | 6/1897 | Woods | 180—60 |
| 1,861,145 | 5/1932 | Sommer | 180—60 |
| 2,420,100 | 5/1947 | Salsbury | 180—70 |
| 2,671,519 | 3/1954 | Cheramie | 180—6.48 |
| 2,953,212 | 9/1960 | Lee | 180—44 |

A. HARRY LEVY, *Primary Examiner.*

U.S. Cl. X.R.

74—208; 180—6.48, 65